May 29, 1928.  
E. PODSZUS  
1,671,683  
METHOD AND DEVICE FOR PRODUCING FINELY GRANULATED BODIES FROM MOLTEN METAL  
Filed May 7, 1925
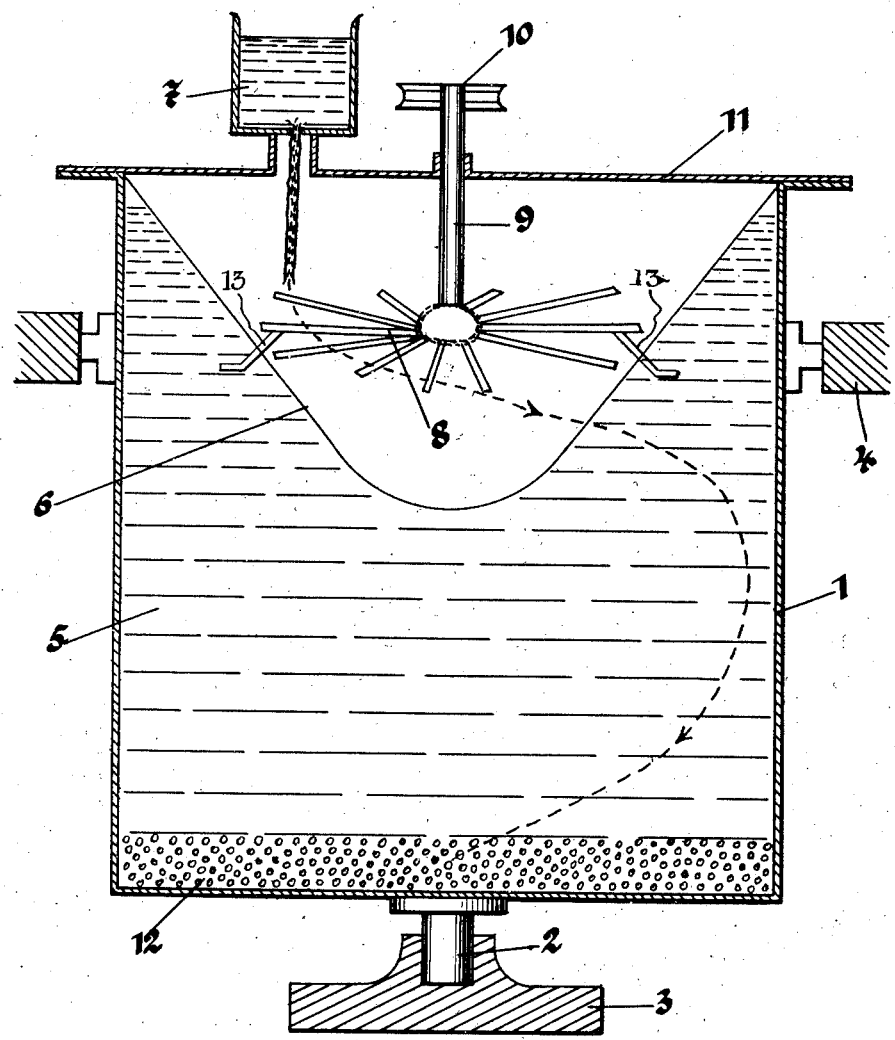

Patented May 29, 1928.

1,671,683

UNITED STATES PATENT OFFICE.

EMIL PODSZUS, OF BERLIN-FRIEDRICHSHAGEN, GERMANY, ASSIGNOR TO HARTSTOFF-METALL AKTIENGESELLSCHAFT (HAMETAG), OF BERLIN-COPENICK, GERMANY.

METHOD AND DEVICE FOR PRODUCING FINELY-GRANULATED BODIES FROM MOLTEN METAL.

Application filed May 7, 1925, Serial No. 28,700, and in Germany May 7, 1924.

My invention relates to processes and devices for producing metal granules and more particularly such granules as do not adhere to each other and are approximately spherical and have a smooth and clean surface.

Molten metal can be broken up into small bodies or granules in various ways as by flinging, squirting, spraying and the like operations. In all cases the small individual metal bodies reach a very high speed which tends to prevent the desired object from being accomplished. Thus the small bodies are liable to be frayed when they cool down, while travelling at a high speed and furthermore there is the danger of numbers of the small bodies being welded together during their flight even if they are caused to travel through cooling liquids. They are particularly liable to be welded together when they reach the bottom or the walls of a vessel in which they are produced. Attempts have been made to produce metal granules in this manner, but these attempts, and particularly the attempts to produce small granules, have been unsuccessful.

The object of this invention is a practical and simple process for producing granulated metal in a small space. This is accomplished by breaking up a jet of liquid metal into small metal bodies and causing the latter to travel a certain distance from the point where they are produced and to then enter into a continuous suitably moved layer of liquid which tends to retard their travel. This layer or these layers of liquid must be of such thickness or depth that the small metal bodies are sufficiently solidified before they contact with each other or with the walls of the vessel in which they are produced even if the initial speed of the bodies is very high. The retarding liquid into which the small metal bodies or liquid granules are flung is preferably such that either the liquid itself or its vapours will not attack the molten metal but will rather have a reducing effect. It has been found that organic substances with a high melting point, such as tetralin, melted paraffin or the like, are particularly suitable to act as a retarding liquid. The small metal bodies or granules are cooled in the liquid sufficiently to become solidified. A preferred manner of carrying out the invention is the following:

The retarding liquid is caused to rise up along the sides of a vessel by a centrifugal action and the liquid metal is smashed to small bodies or granules in the paraboloid-shaped hollow in the middle of the revolving liquid. The centrifugal action of the liquid is brought about either by the stirring of the liquid, or by the rotation of the liquid container.

A device for carrying out the process in accordance with the present invention is illustrated more or less diagrammatically in the drawing in which 1 is a rotating vessel with a vertical stub shaft 2 journalled in a footstep-bearing 3. The vessel 1 is supported at the sides in a ring bearing 4. When the vessel is rotated at a high speed, the liquid 5 in the same rises along the walls of the vessel due to the centrifugal force and in the hollow space or cavity 6 which has the form of a paraboloid a beating member consisting of rotating arms 8 attached to a vertical shaft 9 is placed. The shaft 9 which is journalled in the cover 11 is rotated at high speed by means of a pulley 10. Mounted on the lid 11 is a vessel 7 adapted to contain liquid metal. The vessel 7 has one or more apertures through which liquid metal flows into the hollow space 6. The jet or jets of liquid metal are shattered by the beating device 8 are caused to fly into the liquid 5. The metal fragments or granules are diverted during their flight by the rotating liquid and travel in the liquid along a helical path as indicated by the broken line and the arrow heads. After having travelled in a helical path in this manner they eventually reach the bottom of the vessel. The granules are thus caused to traverse a comparatively long distance through the liquid which retards them, so that they have sufficient time to contract into the form of small balls, before they reach the wall or the bottom of the vessel, or before they impinge upon each other. Metals with a high melting point take a comparatively long time to cool down, and the time that elapses between the moment when they enter the retarding liquid and the moment when they have become solid will thus be greater or smaller according to the melting point of the metal.

As the entire vessel 1 rotates the granules distribute themselves uniformly over the bottom of the vessel so that no heaping up of granules at any one place will take place that might result in the descending particles reaching the precipitated granules before they are sufficiently cooled to prevent them from fusing together.

By the use of a retarding liquid for the molten metal that has no oxidizing effect, but even tends to counteract oxidation, very smooth and clean metal granules are obtained. As a further means toward accomplishing this end the space above the retarding liquid may be filled with indifferent gases. The gas used is preferably heavier than air and may be carbonic acid for example. By using such a gas the molten metal descending from the vessel 7 or the particles produced by the rotating arms 8 are prevented from oxidizing before they reach the retarding liquid 5.

As the vapours of most liquids suitable for use as the retarding liquid form an explosive mixture with air which might be ignited by the red hot liquid metal, the indifferent atmosphere or gas in the space 6 offers the further advantage that it prevents such explosions or ignition of the retarding liquid.

A further feature of the invention consists in means for protecting the beating member 8 which shatters the jet or jets of liquid metal.

In the practical application of the process it has been found that the molten metal tends to adhere to the beating member and to form lumps thereon or to attack the same, thus interfering with the shattering operation and even causing damage to the beating or shattering member. These drawbacks are obviated according to the invention by said member being kept supplied with a copious coating of non-oxidizing liquid of a sufficient vapour pressure. This liquid may consist of tetralin, or the like.

Even if the strokes of the beating member are extremely rapid there will always be an effective coating of liquid on the member to prevent the molten metal from adhering to the same. This coating is applied in the following manner:

The arms of the star-shaped beating member 8 are moved so that the metal particles that tend to adhere to them fly off in the longitudinal direction of the arms. The beating member is preferably made in the shape of a very flat circular broom, the bristles or rods of the broom being arranged radially in one or more planes. The broom is rotated at a high speed of say 3500 revolutions per minute around the vertical axis. To prevent the radial arms from being burnt or to obviate the adherence of metal thereto they are kept coated with a liquid which may be the same as that used for retarding the flight of the granules and has no oxidizing effect on the metal. The coating of the broom with this liquid may be effected continuously or intermittently.

Thus, the liquid may be caused to continuously trickle or wash over the arms 8 of the beating-member during its operation, or parts as indicated at 13 may be attached to the beating member that dip into the retarding liquid 5 so as to form a spray which forms a continuous coating of liquid on the beating member 8.

I claim:

1. The process of producing very small metal bodies which consists in subdividing the molten metal while still liquid into a large number of very small individual units at the same time imparting to such units great speed and then causing said individual units to enter a continuously recurring rapidly moving deep layer of a liquid, thereby braking the speed of said units so as to enable them to solidify before striking each other or any other body.

2. The process as specified in claim 1, in which the retarding liquid both in its vaporous and liquid state is indifferent towards said metal units.

3. The process as specified in claim 1, in which the retarding liquid both in its vaporous and liquid state counteracts oxidation of said metal units.

4. The process as specified in claim 1, in which the retarding liquid consists of tetralin.

5. The process as specified in claim 1, in which a layer of indifferent gas is formed above the rapidly moving layer of retarding liquid.

6. The process as specified in claim 1, in which a layer of carbonic acid gas is formed above the rapidly moving layer of retarding liquid.

7. The process as specified in claim 1, in which for subdividing the liquid metal a rapidly moving beating member is used, and a non-oxidizing liquid is applied to said beating member to prevent the liquid metal from adhering thereto.

8. The process as specified in claim 1, in which for subdividing the liquid metal a rapidly moving beating member is used and tetralin is applied to the beating member to prevent the liquid metal from adhering thereto.

9. A device for producing very small metal bodies comprising a vessel containing a non-oxidizing liquid, means for rotating said liquid causing it to rise along the walls of said vessel while rotating, means for introducing the liquid metal into the vessel, and means for breaking up the metal while still liquid into very small metal units and causing said units to enter the non-oxidizing liquid.

10. A device for producing small metal bodies comprising a rotatable vessel containing a non-oxidizing liquid adapted to rise along the walls of said vessel as the latter rotates forming a hollow cone, means for introducing liquid metal into the center of said vessel, and means arranged in the center of said vessel for breaking up the liquid metal into small units, and causing said units to enter said non-oxidizing liquid.

In testimony whereof I have affixed my signature.

EMIL PODSZUS.